June 10, 1969   B. E. BUDAHN   3,449,127
APPARATUS AND METHODS FOR CONTINUOUSLY MANUFACTURING CHEESE
Filed Sept. 25, 1964
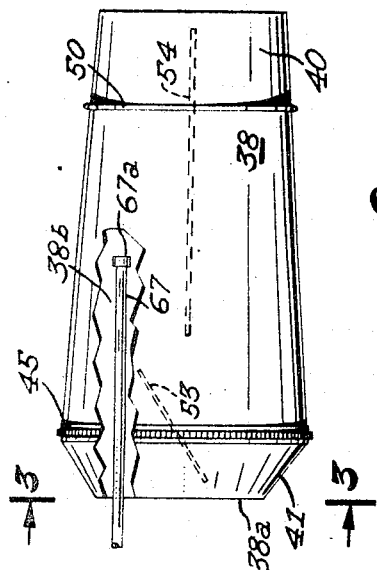
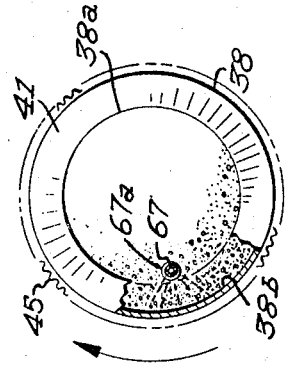
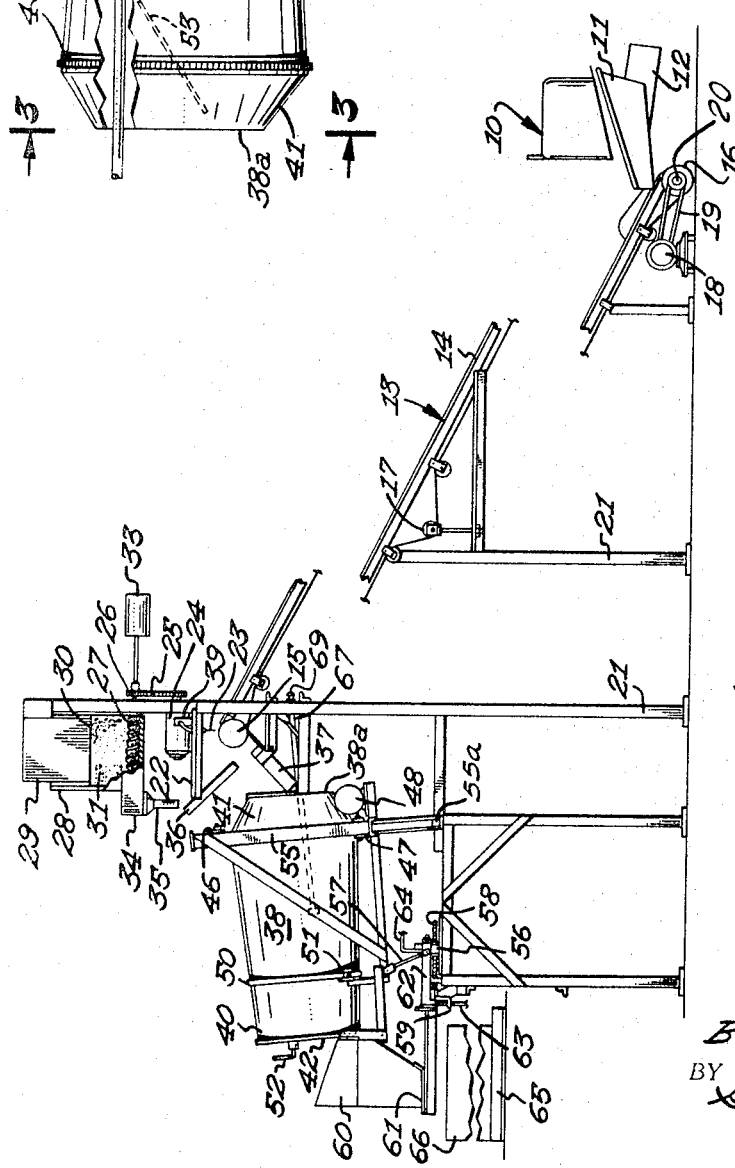
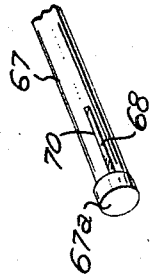
INVENTOR.
BURNELL E. BUDAHN
BY Schroeder, Siegfried
& Ryan
ATTORNEYS

United States Patent Office 3,449,127
Patented June 10, 1969

3,449,127
APPARATUS AND METHODS FOR CONTINU-
OUSLY MANUFACTURING CHEESE
Burnell E. Budahn, Norwood, Minn., assignor to Industrial Plant Service & Mfg. Co., Minneapolis, Minn., a corporation of Minnesota
Filed Sept. 25, 1964, Ser. No. 399,232
The portion of the term of the patent subsequent to Oct. 26, 1981, has been disclaimed
Int. Cl. A23c 19/02; A01j 25/10
U.S. Cl. 99—115                                    12 Claims

ABSTRACT OF THE DISCLOSURE

Disclosed herein is apparatus and methods for continuously manufacturing cheese by milling curd slabs into small chunks, applying a proportionate amount of salt thereto, and tumbling the salted curd through an open ended drum into cheese hoops, all in a continuous operation. Steam is released within the interior of the mass of curd as it is tumbled to produce a higher grade cheese.

---

This invention relates to cheesemaking. More particularly, it relates to apparatus constructed and arranged for use in the continuous manufacture of cheese from preprepared cheese curd and to the improved methods for use in such manufacture.

This application is related to my two copending applications one of which is entitled "Apparatus for Continuously Manufacturing Cheese," Ser. No. 277,862, filed May 3, 1963 by me issued on Oct. 27, 1964 as U.S. Letters Patent No. 3,154,002 and the other of which is entitled "Method of Manufacturing Cheese Continuously," Ser. No. 277,856, filed May 3, 1963 by me and issued on Nov. 10, 1964 as U.S. Letters Patent No. 3,156,567.

The apparatus and methods disclosed and claimed in my two previous applications identified above are highly superior to apparatus and methods heretofore known for the commercial manufacture of cheese. I have found, however, through additional experimentation that an even more improved result can be obtained through the proper positioning of the discharge of the steam dispensing means and the use thereof. I have found that the texture, consistency and grade of the cheese can be substantially improved if care is taken to discharge the steam at a point such that the discharge of the steam dispensing means will at all times be covered by the curd while it is being tumbled in the drum. I have found that by so doing the steam tempers the curd at the desired temperature so that the particles thereof will adhere to each other properly and the salt will coat the individual pieces of curd more uniformly throughout, thereby improving the consistency and grade of the cheese as well as the texture thereof. As a result, when cheese is made in accordance with the apparatus and methods disclosed herein and a plug is removed as is conventional in sampling the cheese, a "candleplug" will be withdrawn. In the trade this means that the plug of cheese will be smooth like a candle and will not be pitted and will have the same consistency or texture throughout.

Accordingly, it is a general object of my invention to provide novel and improved apparatus and methods for continuously manufacturing cheese from preprepared curd.

A more specific object is to provide novel and improved apparatus and methods for manufacturing cheese continuously from preprepared curd on a commercial scale.

Another object is to provide novel and improved apparatus and methods for manufacturing cheese continuously from preprepared curd which is simple and inexpensive to manufacture, assemble and operate and which will produce cheese having improved texture, consistency, and grade.

Another object is to provide novel and improved apparatus and methods for manufacturing cheese continuously from preprepared curd on a commercial scale in such a manner as to cause the curd to be tempered at the desired temperature, thereby causing the particles thereof to adhere to each other properly and at the same time insuring that the salt will adhere uniformly to the pieces of curd throughout the cheese.

Another object is to provide novel and improved apparatus and methods for manufacturing cheese continuously from preprepared curd in such a manner as to produce cheese of substantially improved quality at unusually high volume capacity in a continuous operation while effecting substantial savings in labor and in the quantity of cheese produced from a given quantity of milk.

These and other objects and advantages of my invention will more fully appear from the following description, made in connection with the accompanying drawings, wherein like reference characters refer to the same or similar parts throughout the several views, and in which:

FIG. 1 is a partially diagrammatic side elevational view of my apparatus with portions of the conveyor and cheese container omitted to facilitate the disclosure and with portions of the salt dispensing mechanism broken away to better illustrate the construction and operation thereof.

FIG. 2 is a top plan view of the tumbling drum with portions thereof broken away to better illustrate the position of the steam dispensing means and its discharge.

FIG. 3 is a front elevational view of the tumbling drum taken along line 3—3 of FIG. 2, and FIG. 4 is a fragmentary perspective view of the discharge end portion of the steam dispensing means showing the particular details thereof.

The preferred embodiment of my invention is shown in FIGS. 1–4. In general, the construction thereof is identical to that disclosed in my copending applications referred to above, Ser. No. 277,856, entitled "Method of Manufacturing Cheese Continuously" and Ser. No. 277,863, entitled "Apparatus for Continuously Manufacturing Cheese." The essential difference in the construction, however, lies in the arrangement and positioning of the discharge of the steam discharging means and its relation to the direction of the tumbling drum. Accordingly, reference may be made to my copending applications for additional disclosure as to the construction of the remainder of the apparatus shown and described herein.

As best shown in FIG. 1, the milling device 10 is disposed above a vibrator 11 which is vibrated rapidly by a vibrating mechanism shown generally and indicated by the numeral 12. The vibrator 11 is sloped somewhat downwardly and forwardly to discharge upon an elongated upwardly inclined continuous conveyor indicated generally by the numeral 13. The preprepared milled curd is deposited upon the conveyor 13 by the vibrator 11 in a uniform layer which is approximately 1–2 inches thick or, considered with respect to the particle size, with a depth of approximately 2–3 particle thickness. The conveyor 13 includes preferably a continuous rubber belt 14 which passes around an upper roller 15 and a lower roller 16. A tightener 17 is provided to permit the tensions applied to the rubber apron 14 to be varied as desired. An electric motor 18 by means of a belt 19 drives a sheave 20 which is connected to the roller 16 in driving relation to cooperatively drive the apron 14 so as to carry the curd forwardly and upwardly as illustrated. It will be noted that the entire conveyor 13 is supported by an upstanding frame 21.

The uppermore portions of the frame 21 support a horizontal platform 22 which in turn supports an electric motor 24 which carries a continuous chain drive 25 that extends upwardly around a sprocket 26 to drive an auger conveyor 27. This auger conveyor 27 is disposed within the lower part of a generally V-shaped feeder bin 28. The feeder bin 28 is also supported upon the platform 22 and it is continuously fed by a charging bin 29 the lower end 30 of which extends downwardly into the interior of the feeder bin 28 to maintain a constant supply of salt 31 for the auger conveyor 27 and to maintain the upper level of the salt at a predetermined elevation so as to maintain a uniform pressure or weight of salt upon the auger conveyor 27 to insure a uniform rate of feeding by the auger if the auger is operated at a uniform speed. The motor 24 is provided with a positive instantly variable drive which drives the continuous chain 25 so that the speed of rotation of the auger 27 may be varied as desired.

A tachometer 33 is connected to the continuous conveyor 27 so that the number of revolutions per minute may be observed continuously, if desired. The forward end of the auger conveyor 27 extends into a conveying tube 34 which discharges into a funnel 35 which in turn discharges the salt into a chute member 36. The chute member 36 is inclined downwardly and rearwardly and discharges the salt into a chute 37 which is mounted on the frame 21 and extends downwardly and forwardly into the tumbling drum as will be hereinafter described. It should be noted that the chute 37 is positioned in receiving relationship to the discharging upper end of the conveyor 13 so that the milled curd will be discharged into the chute 37 and carried thereby into the interior of the tumbling drum.

Pivotally mounted upon the frame 22 is a curd engaging blade 23 which extends downwardly into the path of the curd carried by the conveyor 13 and engages the same. It is mounted for swinging movement about a horizontal axis extending transversely of the conveyor 13 and is constructed and arranged in controlling relationship with a switch mechanism indicated generally by the numeral 39. It is so arranged in controlling relationship with the switch mechanism as to hold the switch of the latter in closed position so long as the blade 23 is deflected off vertical position by the flow of the milled curd along the belt 14. When the flow of the milled curd ceases, the blade 23 returns to vertically hanging position and permits the switch to open. The switch mechanism 39 is interposed in the electric circuit supplying power to the electric motor 24 so as to cause the motor 24 to cease operation when the flow of curd ceases and hence arrest the dispensation of salt by the salt dispensing conveyor 27.

As best shown in FIG. 1, the lower end of chute 37 terminates within the interior of a rotating tumbling drum 38. As shown, this rotating tumbling drum is pivotally supported by the frame 21 adjacent its receiving end 38a. The tumbling drum 38 is open-ended and, accordingly, has a discharging end 40. The receiving end 38a is tapered inwardly as at 41 and the remainder of the drum tapers gently toward the discharging end 40. The discharging end 40 is closed to a substantial extent by a closure plate 42. This plate 42 is supported by support brackets (not shown) which have slots on their lower ends to receive securing bolts (not shown) which are carried by the frame 21. Reference may be made to my copending applications referred to hereinbefore with respect to these elements.

Encircling the tumbling drum 38 adjacent its receiving end 38a is a ring gear 45. The teeth of the ring gear extend outwardly and cooperate with an idler gear 46 which is disposed at the top and center of the drum and a pair of gears disposed at the opposite and lower side of the drum. One of these gears (not shown) is an idler gear and the other gear 47 is driven by an electric motor 48 by means of a gear reduction mechanism such as disclosed in my copending applications referred to hereinabove to cause the drum 38 to rotate continuously. An annular rail 50 encircles the drum 38 adjacent the discharge end 40 thereof. This rail 50 is received within the grooves of a pair of circumferentially grooved idler rollers one of which is not shown and the other of which is identified by the numeral 51. These rollers 51 are disposed at opposite sides of the drum 38 and adjacent the lower portions thereof. It will be noted that the drum 38 is disposed so as to rotate about a generally horizontal axis, the axis of the drum as shown being inclined slightly downwardly and forwardly.

A thermometer 52 is mounted on the closure plate 42 and is connected with the interior of the drum so as to record the temperature therewithin.

The tumbling drum 38 has an inner wall 38b which carries and tumbles the curd as the drum rotates. Mounted upon the inner wall 38b and extending radially inwardly therefrom is a plurality of tumbler blades or progressor elements 53. As shown in FIG. 2, these tumbler blades 53 extend axially of the drum. They also extend at an angle to the axis of rotation so that the end thereof closest to the discharging end trails as the drum is rotated. These tumbling blades 53 engage the milled curd and carry the same around with the drum 38 until the tumbler blade reaches a position adjacent the uppermost portion of its path at which point the curd tumbles off the blade and falls to the lowermore portions of the tumbling drum. The direction of rotation of the tumbling drum is shown by the arrow in FIG. 3. The orientation of these blades relative to the axis of rotation of the drum causes the curd to be gradually progressed toward the discharging end 40 of the drum and eventually the curd is discharged from the discharging end 40.

Also mounted upon the inner surface of the tumbling drum 38 is a plurality of curd rolling elements 54 which extend axially of the drum and also radially inwardly but to a much lesser extent than the blades 53. These blades 54 are also orientated at an angle to the axis of rotation of the drum 38 but to a lesser degree than the blades 53. These rolling elements 54 engage the curd and cause the latter to roll over the top thereof as the drum rotates. They do not carry the curd upwardly along the side of the drum to any appreciable extent but rather induce the curd to roll relative to each other with the major portion of the curd passing over the top of the individual elements 54.

It will be noted that the tumbling drum 38 is partially enclosed by a rectangular framework 55 and that this work is pivotally mounted as at 55a upon the frame 21 so that the discharging end 40 thereof can be elevated or lowered as desired. To accomplish the adjustment of the discharging end 40 of the drum I utilize an internally threaded sleeve 56 which is pivotally connected by a link 57 to the frame 55 adjacent the discharging end 40 of the tumbling drum. This sleeve 56 threadedly engages a screw threaded shaft 58 which can be rotated about its longitudinal axis by means of a crank 59.

A filling chute 60 is carried by the frame 55 in receiving position relative to the discharging end 40 of the drum 38. The chute 60 is provided with a transversely slidable gate 61 which is operated by an air cylinder 62 which is provided with air by means of hoses 63, and 64.

Disposed beneath the filling chute 60 is an over and under scale 65 which is provided with an electric eye (not shown) and which is not a part of the invention shown and claimed herein, that is electrically connected with an electronic control for valves disposed in the air lines 63 and 64 so that when the desired weight of curd has been received within the cheese barrel or hoop 66, the gate 61 will be caused to move to closed position. The barrel or hoop 66 may be moved manually, if desired, and replaced by another barrel or hoop. An automatic timing device is connected with the air cylinder 62 so as to cause it to open the gate after a predetermined period of time has elapsed subsequent to the closing of the gate 61.

A steam dispenser 67 having a discharge 68 disposed within the interior of the drum 38 is provided in order to continuously inject steam into the interior of the rotating drum 38. It is at this point of the construction and method of manufacturing cheese continuously that the apparatus and methods disclosed herein differ from those set forth in my preceding copending applications referred to hereinabove. This steam dispenser 67 is connected by a hose 69 to a source of pressurized live steam (not shown) which maintains the steam under a pressure of about 100 p.s.i. Manual control valves (not shown) may be provided, if desired, or if desired, electrically controlled valves may be interposed in the line 69 and connected with the salt dispensing apparatus so as to insure that steam will be injected at all times while curd is being received within the tumbling drum 38. It is important that the steam be dry and clean and consequently, I utilize a steam purifier and trap in the steam line before it enters the drum in the conventional manner.

In my preceding co-pending applications referred to hereinabove, I merely disclose steam dispensing means for dispensing steam within the interior of the drum. As indicated hereinabove, however, I have found that a substantial improvement in the texture, consistency, and grade of the cheese can be accomplished by positioning the steam dispensing means so that the discharge 68 thereof is in the direct path of the tumbling curd so that the latter continuously covers the discharge and the steam emitting therefrom is released within the interior of the mass of the curd as best shown in FIG. 3. It will be seen by reference to FIG. 2 that the steam dispensing conduit 67 is disposed so that it enters the inlet end 38a of the drum at a point immediately adjacent the opening defining portions of the drum and extends longitudinally of the drum and terminates at a point approximately midway between its ends. The end of the conduit 67 is closed as with a cap 67a and a slot 70 defines the discharge. This slot 70 is approximately ⅛ inch wide and 2 inches long and it is directed laterally toward the inner wall 38b of the drum and into the curd as it is carried upwardly as best illustrated in FIG. 3.

The length of the steam dispensing means which extends within the rotating drum is approximately three feet. It will be noted that the conduit 67 is disposed laterally of the longitudinal axis of the drum and slightly therebelow. The discharge 68 is positioned preferably approximately four inches from the inner wall of the drum directly opposite the same and approximately two inches below the center line of the drum, or in other words, approximately ten inches above the bottom of the drum. I have found that when the discharge 68 is so positioned directly in the path of the curd which is being elevated and tumbled so that the discharge 68 is at all times covered with the curd, the cheese which is produced is substantially improved in texture, consistency, and grade. It appears that the release of the steam within the mass of the curd tempers the curd and maintains it at the desired temperature so that the particles thereof will adhere to each other properly and will subsequently knit in a preferred manner. In addition, the release of the steam within the curd tends to preclude its condensation and insures uniform distribution throughout the curd of both the moisture and the salt which has been added thereto. As a result the salt adheres uniformly to the particles throughout the mass of cheese which is formed therefrom and consequently, the cheese will attain a higher grade than would otherwise be possible. I have found that when the cheese is manufactured in this manner and is subsequently tested by removing a plug therefrom, the test will yield a "candleplug" which is considered most desirable in the cheese industry. In other words, the plug which will be removed will be smooth in a manner similar to a candle and will have an improved texture and consistency as compared to cheese manufactured by other methods.

In operation the slabs of preprepared cheese curd are introduced into the milling device 10 continuously either by hand or through the use of a conveyor. It will be understood that the preprepared curd has been prepared in the usual manner conventional in dairy plants and has been arranged in slabs as is conventional. The conventional milling device 10 mills the curd into a plurality of small pieces of cheese curd which are deposited upon the vibrator 11. The vibrator 11, which is driven by the mechanism 12, causes the milled curd to be deposited upon the upper surface of the rubber apron 14 in a uniform layer of approximately 1-2 inches in depth from whence it is carried upwardly to the upper end of the conveyor 13 at which point the curd engages the blade 23. Engagement of the blade 23 by the curd causes it to move or swing to the left as viewed in FIG. 1 and thereby actuate or close the switch in the switch mechanism 39 which in turn actuates the motor 24 and the salt dispensing mechanism 27. As the auger 27 is driven, it carries salt into the conveying tube 34 and deposits the same via the funnel 35 into the chute 36 from whence the salt descends and engages the milled curd as it is discharged off the upper end of the conveyor 13. The salt which is discharged from the chute 36 and the milled curd descends into the chute 37 and is carried into the interior of the continuously rotating tumbling drum 38 as will be readily understood by reference to FIGURE 1.

Concurrent with the dispensation of the salt by the auger 27, steam is injected into the interior of the rotating drum 38 via the discharge 68. As previously pointed out this may be accomplished through the use of manual valves or electronically controlled valves which are electrically connected with the salt dispensing mechanism 27 so that whenever salt is being dispensed, steam is also being dispensed into the interior of the rotating drum 38 and into the interior of the mass of the curd which is being tumbled. I have found that live steam which is maintained under pressure of 100 p.s.i. upon being released as specified within the interior of the mass of the curd is sufficient to maintain the temperature of the cheese curd and salt at approximately 102° F. plus or minus one degree. I have found that this is the optimum temperature for the production of a superior product and the prevention of substantial loss which normally would result from the handling of the cheese curd. Although the temperature within the drum 38 may range between 96°–106° F. and still perform a continuous cheesemaking operation, I have found that the best results are obtained if the temperature of the curd is increased by moist heat to approximately 102° F. The temperature of the slabs of curd at the time they are deposited into the milling device 10 is approximately 96° F. and this temperature is conventionally the temperature of slabs of curd when they are milled in the conventional manner which involves a prolonged period of raking, milling, settling, etc. In the conventional manner, however, the mixing, etc. is accomplished within vats and a substantial loss of butter-fat results from the curd which touches the bottom of the vat while the temperature of the milled curd at the top of the pile drops to a level below that which is desirable for the formation of cheese.

Rotation of the drum 38 will, of course, cause the tumbling blades 53 to engage the curd and salt as it is deposited into the drum. The mixed curd and salt will be carried upwardly by the tumbling blades 53 to a position adjacent the uppermore portions of the path of movement of these blades at which point the curd and salt tumble downwardly from the blades to the lowermore portions of the drum. In so doing, the milled curd and salt will completely surround the discharge 68 of the steam dispensing conduit 67 so that the steam will be released within the interior of the mass of the curd. It is obvious that continuous rotation of the drum 38 will cause this action to be repeated continuously.

The operation, as well as the advantages and the speeds, temperatures and their pressures set forth in my preceding applications as referred to hereinabove are equally applicable to the invention disclosed herein and consequently, no additional reference will be made herein to these advantages although, of course, they are included by reference thereto. Likewise, the length of time which is considered ideal for the curd to pass through the drum is the same. All of the advantages set forth in my preceding applications which are copending and referred to hereinabove are obtained through the operation of the apparatus disclosed herein and in addition, the quality of the cheese which is produced is substantially upgraded in that the texture and consistency of the cheese is substantially improved with the result that a consistently higher grade of cheese can be obtained through the use of this equipment and by practicing the methods set forth herein.

Wherever hereinafter the term "as milled" is utilized, it is intended to connote that the milled curd has not been stirred and/or heated in a vat subsequent to the milling operation as is conventional in the standard cheesemaking processes and that the milled curd is essentially in the same condition as it was as it left the curd milling device. Wherever hereinafter the term "tumbling the curd immediately" is used, it is intended to connote that the curd is tumbled without undue delay and without being permitted to remain undisturbed sufficiently long so that the milled pieces of curd will adhere to each other to such an extent that they will not separate of themselves upon tumbling of the same.

It will, of course, be understood that various changes may be made in the form, details, arrangement and proportions of the parts without departing from the scope of this invention which consists of the matter shown and described herein and set forth in the appended claims.

What is claimed is:

1. In apparatus for making cheese in a continuous operation from slabs of cheese curd comprising:
   (a) a power-driven milling device for continuously milling slabs of cheese curd,
   (b) a continuously rotatable open-ended tumbling drum mounted for rotation and rotating about an axis inclined off horizontal and having a receiving end and a discharge end,
   (c) means for transferring the milled curd from said milling device into the receiving end of said tumbling drum,
   (d) salt dispensing means for adding a predetermined proportionate amount of salt to the curd as it is transferred to said tumbling drum, and
   (e) live steam dispensing means having a discharge discharging live steam under pressure into the interior of said tumbling drum as it so rotates,
   (f) the discharge of said steam dispensing means being elevated relative to the bottom of said drum and being disposed laterally of the longitudinal axis thereof at the side of said drum towards which the curd is carried by said drum as it rotates and being disposed in the path of the curd as it is so tumbled so that the curd covers the same continuously as it is tumbled.

2. In apparatus for making cheese in a continuous operation from slabs of cheese curd comprising:
   (a) a power-driven milling device for continuously milling slabs of cheese curd,
   (b) a continuously rotatable open-ended tumbling drum mounted for rotation and rotating about a generally horizontal axis and having a receiving end and a discharging end,
   (c) means for transferring the milled curd from said milling device into the receiving end of said tumbling drum,
   (d) salt dispensing means for adding a predetermined proportinate amount of salt to the curd as it is transferred to said tumbling drum,
   (e) said tumbling drum having an inner wall which carries and tumbles said curd as said drum rotates, and
   (f) live steam dispensing means having a discharge discharging live steam under pressure into the interior of said tumbling drum as it so rotates,
   (g) the discharge of said live steam dispensing means being disposed adjacent the inner wall of said drum and directly in the path of the curd as it is so tumbled so that the curd covers the same continuously as it is tumbled.

3. The structure defined in claim 2 wherein said steam dispensing means discharge is disposed approximately midway between the ends of said drum.

4. The structure defined in claim 2,
   (h) said tumbling drum including tumbler elements within its interior and rotating therewith and constructed and arranged to cause the curd and salt to tumble and progress to and through its discharging end as said drum rotates, and
   (i) said tumbler elements being fixed to the interior surface of said tumbling drum and extending longitudinally and radially inwardly thereof.

5. In apparatus for making cheese in a continuous operation from slabs of cheese curd comprising:
   (a) a power-driven milling device for continuously milling slabs of cheese curd,
   (b) a continuously rotatable open-ended tumbling drum mounted for rotation and rotating about an inclined axis and having a receiving end and a discharging end,
   (c) means for transferring the milled curd from said milling device into the receiving end of said tumbling drum,
   (d) said tumbling drum having an inner wall which carries and tumbles said curd as said drum rotates,
   (e) salt dispensing means for adding a predetermined proportionate amount of salt to the curd as it is transferred to said tumbling drum, and
   (f) live steam dispensing means having a discharge discharging live steam under pressure into the interior of said tumbling drum as it so rotates,
   (g) the discharge of said live steam dispensing means being disposed adjacent the inner wall of said drum at the side of said drum towards which the curd is carried by said drum as it rotates and directly in the path of the curd as it is so tumbled so that the curd covers said discharge continuously as the curd tumbles.

6. In apparatus for making cheese in a continuous operation from slabs of cheese curd comprising:
   (a) a power-driven milling device for continuously milling slabs of cheese curd,
   (b) a continuously rotatable open-ended tumbling drum mounted for rotation and rotating about an axis inclined off horizontal and having a receiving end and a discharge end,
   (c) means for transferring the milled curd from said milling device into the receiving end of said drum,
   (d) salt dispensing means for adding a predetermined proportionate amount of salt to the curd as it is transferred to said tumbling drum,
   (e) said drum having an inner wall which carries and tumbles said curd as said drum rotates,
   (f) live steam dispensing means having a discharge discharging live steam under pressure into the interior of said tumbling drum as it so rotates,
   (g) the discharge of said live steam dispensing means being directed radially outwardly of said drum toward its inner wall and being disposed approximately midway between the ends of said drum and adjacent the inner wall thereof directly in the path of the curd as it is so tumbled so that the curd covers the same continuously as the curd tumbles.

7. In apparatus for making cheese in a continuous operation from slabs of cheese curd comprising:

(a) a milling device for milling slabs of cheese curd,
(b) a continuously rotatable open-ended tumbling drum mounted for rotation and rotating about an inclined axis and having a receiving end and a discharging end,
(c) means for transferring the milled curd from said milling device into the receiving end of said tumbling drum,
(d) said drum having an inner wall which carries and tumbles said curd as said drum rotates,
(e) salt dispensing means for adding a predetermined proportionate amount of salt to the curd as it is transferred into said tumbling drum, and
(f) live steam dispensing means having a discharge discharging live steam under pressure into the interior of said tumbling drum as it so rotates,
(g) said steam dispensing means including a conduit having a closed inner end disposed adjacent the inner wall of said drum and directly in the path of the curd as it is so tumbled so that the curd covers the same continuously as the curd tumbles, said closed end portion having a slot formed therein facing laterally towards the inner wall of said drum and discharging steam thereat,
(h) said tumbling drum including tumbler elements within its interior and rotating therewith and constructed and arranged to cause the curd and salt to tumble and progress to and through its discharging end as said drum rotates.

8. In apparatus for making cheese in a continuous operation from slabs of cheese curd comprising:
(a) a milling device for milling slabs of cheese curd,
(b) a continuously rotatable open-ended tumbling drum mounted for rotation and rotating about an inclined axis and having a receiving end and a discharging end,
(c) means for transferring the milled curd from said milling device into the receiving end of said tumbling drum,
(d) said drum having an inner wall which carries and tumbles the curd as said drum rotates,
(e) salt dispensing means for adding a predetermined proportionate amount of salt to the curd as it is transferred into said tumbling drum,
(f) live steam dispensing means having a discharge discharging live steam under pressure into the interior of said tumbling drum as it so rotates,
(g) said tumbling drum including tumbler elements within its interior and rotating therewith and constructed and arranged to cause the curd and salt to tumble and progress to and through its discharging end as said drum rotates,
(h) said steam dispensing means discharge being disposed approximately midway between the ends of said drum and approximately two inches below the longitudinal axis thereof and approximately four inches from the inner wall of said drum and being directed laterally toward said inner wall of said drum whereby the curd as it is so tumbled by said drum will cover the said discharge continuously as the curd tumbles.

9. In the making of cheese from slabs of cheese curd in a continuous operation from milling to hooping with a substantial saving in butterfat content of the cheese and a substantial reduction in dusting losses and a substantial reduction in time consumed for the operation and with improved cheese texture and consistency, the steps of:
(a) milling slabs of the curd,
(b) spreading a predetermined proportionate amount of salt upon the milled curd,
(c) tumbling the curd immediately as it is milled and salted for such time and under such conditions as required to coat the salt evenly on the curd and keep potential dusting losses in the so tumbled curd along with the full butterfat content thereof,
(d) applying live steam to the interior of the mass of the milled and salted curd as it is so tumbled, and
(e) then discharging the so tumbled curd and salt into containers for subsequent pressing of the curd into cheese.

10. In the making of cheese from slabs of cheese curd in a continuous operation from milling to hooping with a substantial saving in butterfat content of the cheese and a substantial reduction in dusting losses and a substantial reduction in time consumed for the operation and with improved cheese texture and consistency, the steps of:
(a) milling slabs of the curd,
(b) spreading a predetermined proportionate amount of salt upon the milled curd,
(c) tumbling the curd immediately as it is milled and salted for such time and under such conditions as required to coat the salt evenly on the curd and keep potential dusting losses in the so tumbled curd along with the full butterfat content thereof,
(d) releasing live steam within the milled and salted curd at a point disposed inwardly of the outer surface of the mass thereof as it is so tumbled, and
(e) then discharging the so tumbled curd and salt into containers for subsequent pressing of the curd into cheese.

11. In the making of cheese from slabs of cheese curd in a continuous operation from milling to hooping with a substantial saving in butterfat content of the cheese and a substantial reduction in dusting losses and a substantial reduction in time consumed for the operation and with improved cheese texture and consistency, the steps of:
(a) milling slabs of the curd,
(b) spreading a predetermined proportionate amount of salt upon the milled curd,
(c) tumbling the curd immediately as it is milled and salted for such time and under such conditions as required to coat the salt evenly on the curd and keep potential dusting losses in the so tumbled curd along with the full butterfat content thereof,
(d) applying live steam continuously to the interior of the mass of the milled and salted curd as it is so tumbled, and
(e) then discharging the so tumbled curd and salt into containers for subsequent pressing of the curd into cheese.

12. In the making of cheese from slabs of cheese curd in a continuous operation from milling to hooping with a substantial saving in butterfat content of the cheese at a substantial reduction in dusting losses and a substantial reduction in time consumed for the operation and with improved cheese texture and consistency, the steps of:
(a) milling slabs of the curd,
(b) spreading a predetermined proportionate amount of salt upon the milled curd,
(c) tumbling the curd immediately as it is milled and salted for such time and under such conditions over a continuous discharge of live steam to coat the salt evenly on the curd and keep potential dusting losses in the so tumbled curd along with the full butterfat content thereof, and
(d) then discharging the so tumbled curd and salt into containers for subsequent pressing of the curd into cheese.

References Cited
UNITED STATES PATENTS 3,154,002   10/1964   Budahn _____ 99—243
3,156,567   11/1964   Budahn _____ 99—115

A. LOUIS MONACELL, *Primary Examiner.*

D. M. NAFF, *Assistant Examiner.*

U.S. Cl. X.R.
31—46; 99—116, 243